United States Patent [19]

Middlesworth et al.

[11] Patent Number: 5,642,864
[45] Date of Patent: Jul. 1, 1997

[54] CHIPPER VACUUM SHREDDER SYSTEM AND APPARATUS

[75] Inventors: Tommy A. Middlesworth, Sheboygan Falls; Donald G. Penkoske, West Bend; Gerald C. Burmesch, Belgium, all of Wis.

[73] Assignee: Simplicity Manufacturing, Inc., Port Washington, Wis.

[21] Appl. No.: 342,390

[22] Filed: Nov. 18, 1994

[51] Int. Cl.⁶ .......................... B02C 21/02; B02C 23/24
[52] U.S. Cl. ................. 241/58; 241/101.78; 241/285.3
[58] Field of Search ...................... 241/58, 101.78, 241/285.2, 285.3

[56] References Cited

U.S. PATENT DOCUMENTS

| | | |
|---|---|---|
| D. 307,434 | 4/1990 | Payack et al. . |
| D. 307,655 | 5/1990 | Hinklin et al. . |
| D. 319,833 | 9/1991 | Johnston . |
| D. 323,512 | 1/1992 | D'Aleo et al. . |
| D. 329,787 | 9/1992 | Connolly et al. . |
| D. 343,175 | 1/1994 | Baker . |
| 558,262 | 4/1896 | Darling . |
| 1,301,316 | 4/1919 | Plaisted . |
| 1,560,865 | 11/1925 | Sedberry . |
| 1,687,093 | 10/1928 | Holm . |
| 1,753,970 | 4/1930 | Rolfsen . |
| 1,806,748 | 5/1931 | Edwards . |
| 2,141,663 | 12/1938 | Ossing . |
| 2,607,538 | 8/1952 | Larson . |
| 2,733,648 | 2/1956 | Todd . |
| 3,240,247 | 3/1966 | Lautzenheiser . |
| 3,279,828 | 10/1966 | MacFarland . |
| 3,382,902 | 5/1968 | Blanshine et al. . |
| 3,598,326 | 8/1971 | Pennell et al. . |
| 3,688,479 | 9/1972 | Martinson et al. ............ 241/101.78 X |
| 3,712,353 | 1/1973 | Ferry . |
| 3,751,755 | 8/1973 | Smith . |
| 3,817,462 | 6/1974 | Hamlin . |
| 3,861,603 | 1/1975 | Lautzenheiser et al. . |
| 3,897,014 | 7/1975 | Luthi . |
| 3,905,621 | 9/1975 | Demarco . |
| 3,907,214 | 9/1975 | Dankel . |
| 3,942,963 | 3/1976 | Tevis . |
| 3,971,098 | 7/1976 | Davis . |
| 4,011,624 | 3/1977 | Proett . |
| 4,015,406 | 4/1977 | Witt et al. . |
| 4,074,869 | 2/1978 | Johnson . |
| 4,118,826 | 10/1978 | Kaeser . |
| 4,121,320 | 10/1978 | Feiner . |
| 4,227,280 | 10/1980 | Comer . |
| 4,286,670 | 9/1981 | Ackerman . |
| 4,366,594 | 1/1983 | Hyams . |
| 4,564,358 | 1/1986 | Durrant . |
| 4,694,528 | 9/1987 | Comer et al. . |
| 4,699,219 | 10/1987 | Durrant et al. . |
| 4,704,765 | 11/1987 | Ataka . |
| 4,761,943 | 8/1988 | Parker et al. . |

(List continued on next page.)

FOREIGN PATENT DOCUMENTS

| | | |
|---|---|---|
| 2710966 | 9/1978 | Germany . |
| 219652A1 | 12/1983 | Germany . |

*Primary Examiner*—John M. Husar
*Attorney, Agent, or Firm*—Reinhart, Boerner, Van Deuren, Norris & Rieselbach, s.c.

[57] ABSTRACT

A chipper vacuum shredder system and apparatus includes a chipper mechanism, a shredder mechanism and a vacuum mechanism carried by a mobile platform. The vacuum mechanism is coupled to a passage having a nozzle. The nozzle includes an adjustable baffle structure for varying the velocity of air flow for delivering yard waste to the chipper-shredder mechanism. The mobile platform includes a bellcrank height adjusting mechanism which varies the height of the nozzle over a surface to be vacuumed, thereby increasing performance on varying surface conditions, particularly when used in conjunction with the adjustable baffle structure. An adjustable deflector is coupled to an exhaust portion of the vacuum mechanism for directing a stream of air to move yard waste and the like as desired. The chipper system is accessed through a cone-shaped inlet through which branches to be chipped can be inserted.

20 Claims, 4 Drawing Sheets

U.S. PATENT DOCUMENTS

| | | |
|---|---|---|
| 4,765,766 | 8/1988 | Heitmann et al. . |
| 4,778,117 | 10/1988 | Karg . |
| 4,824,034 | 4/1989 | Baker . |
| 4,826,331 | 5/1989 | Baker . |
| 4,834,302 | 5/1989 | Baker . |
| 4,875,630 | 10/1989 | Carlson . |
| 4,881,362 | 11/1989 | Parker et al. . |
| 4,951,882 | 8/1990 | Ober . |
| 5,018,672 | 5/1991 | Peck et al. . |
| 5,056,187 | 10/1991 | Higgins . |
| 5,062,329 | 11/1991 | Connolly et al. . |
| 5,085,376 | 2/1992 | Litchenburg . |
| 5,102,056 | 4/1992 | Ober . |
| 5,142,851 | 9/1992 | Lydy et al. . |
| 5,156,345 | 10/1992 | Baker . |
| 5,199,653 | 4/1993 | Durrant et al. . |
| 5,231,827 | 8/1993 | Connolly et al. . |
| 5,340,035 | 8/1994 | Ford .......................................... 241/55 |
| 5,381,970 | 1/1995 | Bold et al. ................................. 241/55 |
| 5,385,308 | 1/1995 | Gearing et al. ................ 241/101.78 X |

CHIPPER VACUUM SHREDDER SYSTEM AND APPARATUS

BACKGROUND OF THE INVENTION

This invention relates generally to yard waste chipper vacuum shredder systems and devices and, more particularly, to yard waste chipper vacuum shredder systems and devices having variable vacuum suction components.

Chipper vacuum shredder systems have recently become popular due to municipal ordinances and other regulations restricting delivery of yard waste to landfills. Under such regulations, homeowners, rather than municipalities, now have primary responsibility for disposing yard waste, typically through composting on the homeowner's property, private delivery to officially designated sites, or private collection at the homeowner's expense. By reducing the volume of the yard waste, disposal can be made more convenient and less expensive. Chipper vacuum shredder systems have been developed to reduce the volume of yard waste.

Historically, because chipper vacuum shredder systems were large and relatively expensive, they were unsuitable for the limited demands of a homeowner. Those prior designs that were intended for private rather than commercial use often lacked grinding systems capable of reducing the volume of the yard waste effectively. An exception to these prior designs is shown in U.S. Pat. No. 5,156,345 (Baker) which is assigned to the assignee of the present application. While this design addresses many of the previously noted concerns, it lacks mobility. Prior art chipper vacuum shredder systems that are mobile and relatively inexpensive have also suffered from poor performance picking up yard waste from a variety of surfaces commonly encountered by the homeowner. This poor performance has limited the usefulness of prior mobile chipper vacuum shredder systems that were affordable to a home owner.

In view of the foregoing, it is a general object of the present invention to provide a new and improved chipper vacuum shredder system and apparatus.

It is a further object of the present invention to provide a new and improved mobile chipper vacuum shredder system and apparatus that provides improved performance in varying conditions.

It is a further object of the invention to provide a chipper vacuum shredder system and apparatus that is easy to use and relatively inexpensive.

It is a further object of the invention to provide a new and improved mobile chipper vacuum shredder system offering improved performance in varying conditions and significant yard waste volume reduction.

SUMMARY OF THE INVENTION

The invention provides a chipper vacuum shredder system and apparatus including a chipper mechanism, a shredder mechanism and a vacuum mechanism carried by a mobile platform. The vacuum mechanism is coupled to a passage having a nozzle. The nozzle includes an adjustable baffle structure for varying the velocity of air flow for delivering yard waste to the shredder mechanism. The mobile platform includes a bellcrank height adjusting mechanism which varies the height of the nozzle over a surface to be vacuumed, thereby increasing performance on varying surface conditions, particularly when used in conjunction with the adjustable baffle structure. An adjustable deflector is coupled to an exhaust portion of the vacuum mechanism for directing a stream of air to move yard waste and the like as desired. The chipper system is accessed through a cone-shaped inlet through which branches to be chipped can be inserted.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

DESCRIPTION OF THE PREFERRED EMBODIMENT

Figure 1:
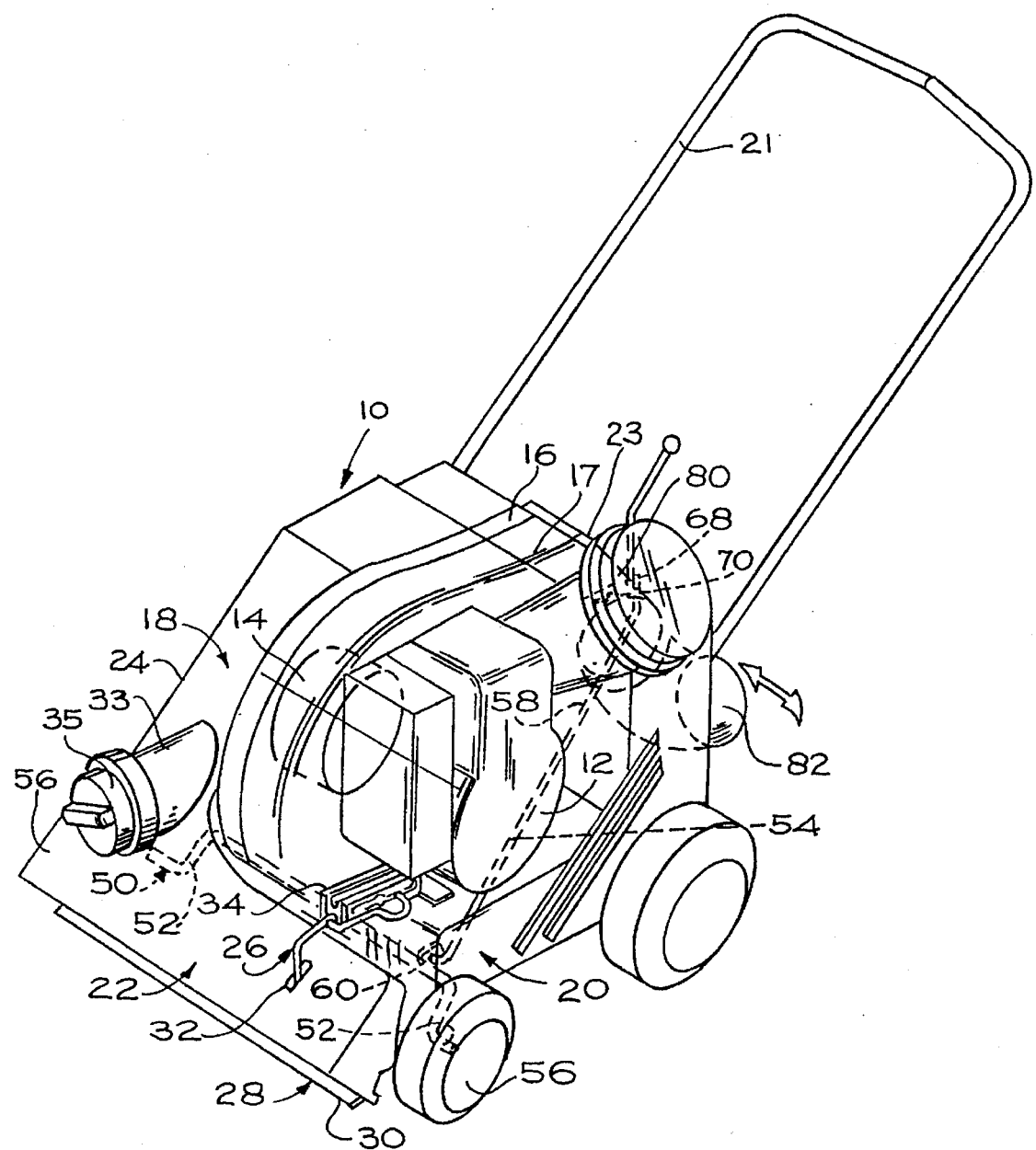
FIG. 1 is a perspective view of a chipper vacuum shredder system and apparatus constructed in accordance with one form of the invention.

Referring to the drawings, a chipper vacuum shredder system 10 and apparatus constructed in accordance with one form of the invention is shown in FIG. 1. The chipper vacuum shredder system 10 is useful for vacuuming yard waste from a yard in a convenient and efficient manner. The chipper vacuum shredder system 10 comprises a motor 12, a shredder mechanism 14, a vacuum mechanism 16, a chipper system 17, an intake passage 18 coupled to the shredder mechanism 14 and the vacuum mechanism 16, and a mobile platform 20. The motor 12, the shredder mechanism 14, the vacuum mechanism 16 and the intake passage 18 are carried by the mobile platform 20. The motor 12 is coupled to the shredder mechanism 14 and, in the preferred embodiment, is coupled to the vacuum mechanism 16 as well. The mobile platform 20 includes a handle 21 for guiding the system 10 across a yard, so that yard waste can be sucked into the intake passage 18 by air flow generated by the vacuum mechanism 16. The yard waste travels along the intake passage 18 to the shredder mechanism 14 where the yard waste is processed. In the preferred embodiment, the yard waste exits the shredder mechanism 14 into the vacuum mechanism 16, from which the yard waste is discharged outside the chipper vacuum shredder system 10.

While the motor 12 is preferably a gasoline engine, electric motors or other power producing sources can be used. The motor 12 must have sufficient power to start and drive the shredder mechanism 14 and the vacuum mechanism 16. The motor can also be used to provide motive force for the mobile platform 20.

The shredder mechanism 14 can be selected from a wide variety of conventional systems. Preferably, however, a chipper-shredder mechanism capable of substantial volume reduction, such as the apparatus disclosed in U.S. Pat. No. 5,156,345 (Baker), is used due to its relatively inexpensive design and favorable performance. In the preferred embodiment, the vacuum mechanism 16 is an integral part of the shredder mechanism 14 with the vacuum mechanism 16 being coupled adjacent and in fluid communication with the shredder mechanism 14. This allows the vacuum mechanism 16 to generate the air flow for moving yard waste through the shredder mechanism 14 to the vacuum mechanism 16. The vacuum mechanism 16 preferably includes a discharge port 23 for discharging the yard waste after it has been processed. The chipper mechanism 17 in this preferred embodiment is coupled to the vacuum mechanism 16 and rotateable therewith.

Figure 4:
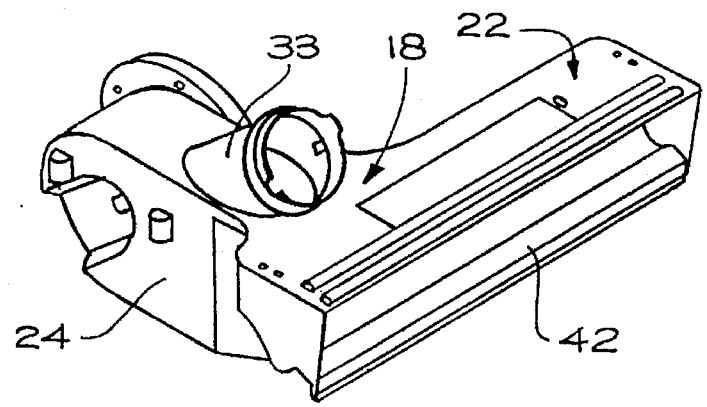
FIG. 4 is a perspective view of an intake passage.

The intake passage 18 is in fluid communication with the vacuum mechanism 16, and preferably is coupled to the shredder mechanism 14 for delivery of the yard waste thereto. The intake passage 18 comprises a nozzle 22 and an inlet pipe 24. The nozzle 22 extends substantially the entire width of the mobile platform 20 and includes an adjusting mechanism 26 for adjusting velocity of the air flow upstream of said vacuum mechanism 16. For the purposes herein "upstream" shall mean in a direction opposite the direction of the air flow. As shown in FIGS. 1 and 4, the intake passage 18 avoids presenting sharp and restricting angles to the air flow and yard waste. Instead, the inboard portions of the intake passage 18 closest to the shredder mechanism 14 are smoothly curved for better flow characteristics and greater suction. This design enhances air flow velocity at the portions of the intake passage 18 farthest from the vacuum mechanism 16.

The adjusting mechanism 26 preferably includes a baffle structure 28 comprising a pivotable flap 30 cooperating with the nozzle 22, a linkage 32 coupled to the pivotable flap 30 and a linkage adjustment mechanism 34. The pivotable flap 30 is illustrated as being adjustable by the linkage adjustment mechanism 34 in a plurality of discrete positions. It will be apparent to one skilled in the art, however, that various linkage adjustment mechanisms 34 such as infinitely variable threaded mechanisms and the like can be used as well.

Figure 2:
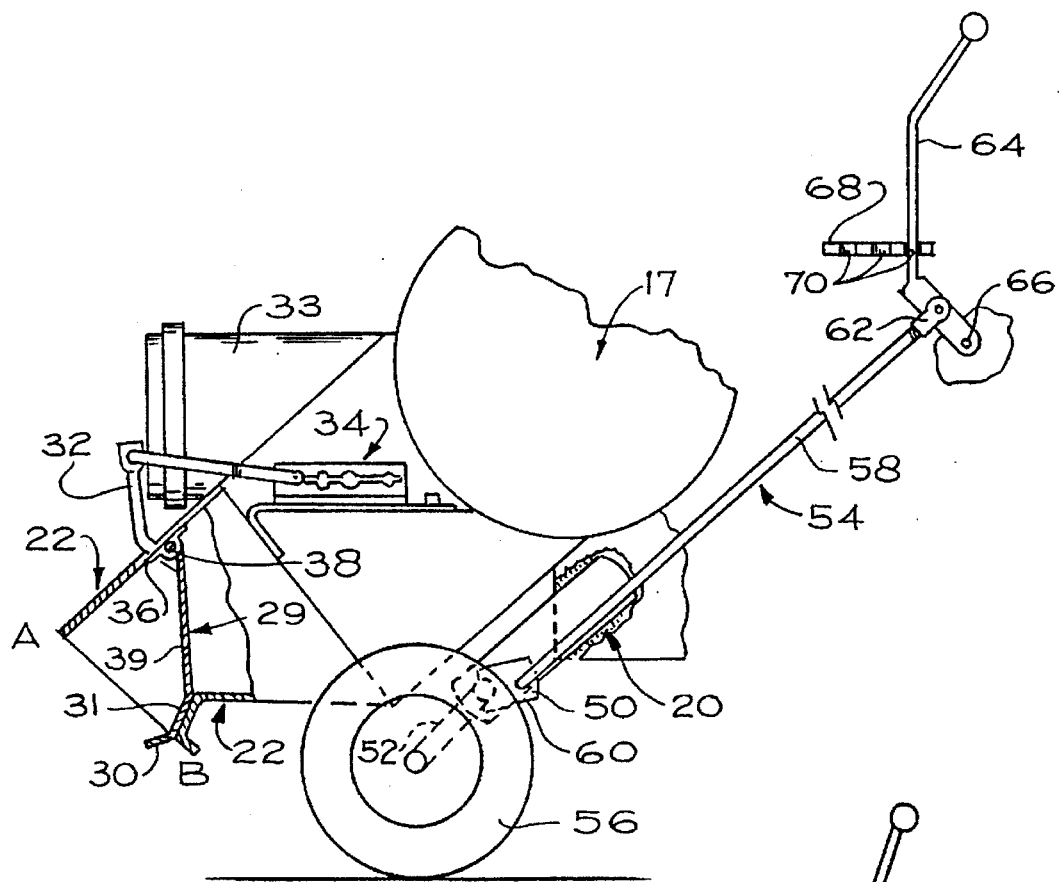
FIG. 2 is a side sectional view of a baffle structure (in its fully closed position) and bellcrank mechanism constructed in accordance with one form of the invention.
Figure 3:
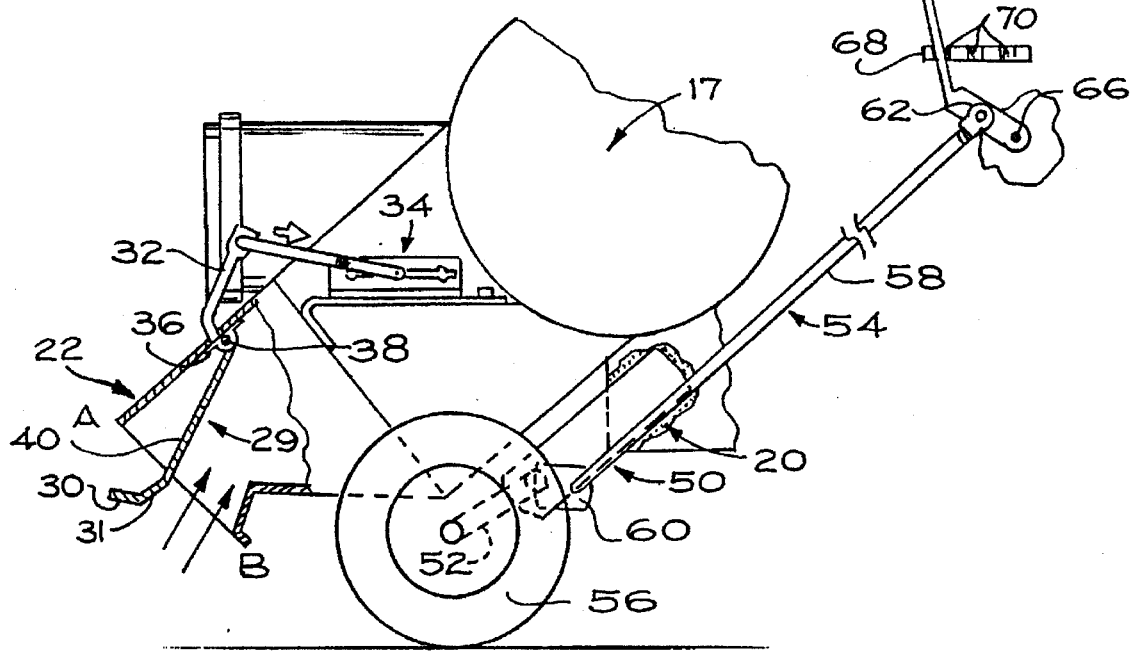
FIG. 3 is a side sectional view of a baffle structure (in a partially closed position) and bellcrank mechanism.

In the preferred embodiment, as shown in FIGS. 2 and 3, the pivotable flap 30 is mounted for rotation using a hinge structure 36 mounted to the nozzle 22 over a rod 38 which is connected to the pivotable flap 30. The linkage 32 is connected to the face 39 of the pivotable flap 30. The linkage 32 moves the pivotable flap 30 in conjunction with the linkage adjustment mechanism 34 between a position A which allows air flow to enter the nozzle 22 generally unimpeded to a position B which substantially blocks all air flow into the nozzle 22. Preferably, in position B, a flat portion 31 of the pivotable flap 30 engages a flat portion of the nozzle 22. Increased suction is available at other inlets of the system 10 when the pivotable flap 30 is in position B. For example, the nozzle 22 preferably includes a hose inlet 33 for attaching an accessory hose (not shown) for vacuuming yard waste around shrubs and in other close spaces. A cap 35 (shown in FIG. 1) is preferably used to close the hose inlet 33 when the accessory hose is not in use. The cap 35 can be coupled to the hose inlet 33 in various ways, though preferably a threaded connection is used. It will be apparent that additional or substitute inlets can be provided without departing from the spirit of the invention.

The pivotable flap 30 can also be adjusted to positions between position A and position B. This adjustment allows the velocity of the air flow to be adjusted depending on the type of yard waste to be processed. For example, the pivotable flap 30 can be adjusted in a position close to position A for processing large volumes of light, dry material such as dry leaves. The relatively unobstructed nozzle 22 provides sufficient suction to rapidly move large volumes of the dry leaves to the shredder mechanism 14. Alternatively, when heavy, wet material or other dense material is to be processed, the pivotable flap 30 can be adjusted to a position closer to position B than position A. This decreases the effective cross-sectional area of the nozzle opening 42, thereby greatly increasing the velocity of air flow. This increased air velocity enables the dense material to be picked up readily. The height of the mobile platform 20 can also be adjusted to increased performance picking up various materials as will be described subsequently.

Figure 5:
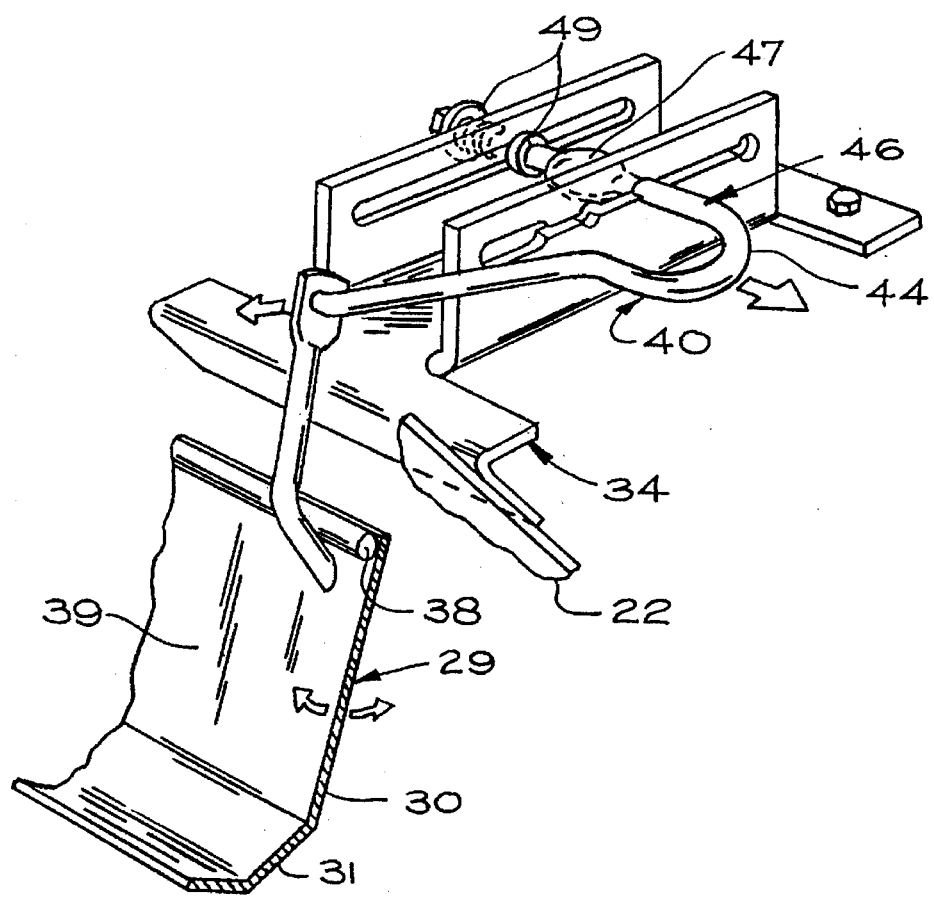
FIG. 5 is a perspective view of a slotted adjustment member and adjusting rod cooperating with the baffle structure shown in FIGS. 2 and 3.

As shown in FIGS. 2, 3 and 5, the pivotable flap 30 comprises a bent plate 29 welded to the rod 38 and also coupled to the linkage 32. The rod 38 is rotatably engaged with the hinge structure 36 connected to the nozzle 22, allowing the pivotable flap 30 to pivot about the rod 38 with respect to the nozzle 22. The linkage 32 is connected to the face of the bent plate 29 at one end, and is connected to an adjusting rod 40 at the other end. The adjusting rod 40 is engageable with a linkage adjustment mechanism 34 in a plurality of positions, thereby providing a like plurality of pivotable flap 30 positions within the nozzle 22. The adjusting rod 40 is spring loaded and securely engages the linkage adjustment mechanism 34 so that the pivotable flap 30 does not move in response to the high velocity air flow generated by the vacuum mechanism 16. The linkage adjustment mechanism 34 is preferably connected to the nozzle 22, thereby providing a stable attachment point for the linkage adjustment mechanism 34.

The adjusting rod 40 includes a U-shaped portion 44 and an engaging portion 46 (as shown in FIG. 5). The U-shaped portion 44 can be grasped and pulled by a user to move the adjusting rod 40 from one discrete position to another. The engaging portion 46 includes a flattened area 47 which is dimensioned to allow sliding movement of the adjusting rod 40 from one discrete position to another when the U-shaped portion 44 is pulled by the user. A biasing spring 48 retains the adjusting rod 40 in position when the U-shaped portion 44 is released because the engaging portion 46 is too large to slide along the linkage adjustment mechanism 34 except at the flattened area 47. The biasing spring 48 is preferably conventionally retained in place by washers and pushnuts 49 which can be used to limit the travel of the adjusting rod 40 as well.

The height of the mobile platform 20 off the surface to be vacuumed can be varied by the bellcrank height adjustment mechanism 50. The bellcrank height adjustment mechanism 50 preferably comprises a bellcrank 52 pivotably mounted to the mobile platform 20 and coupled to a linkage mechanism 54. The bellcrank 52 includes two wheels 56 mounted for rotation at the ends of the bellcrank 52. As will be apparent to one of ordinary skill in the art, mounting the bellcrank 52 for rotation with respect to mobile platform 20 as shown in FIGS. 1, 2 and 3 allows the height of the mobile platform 20 and the nozzle 22 to be varied as the bellcrank 52 rotates. The rotation of the bellcrank 52 is controlled by the linkage mechanism 54 coupled thereto. The linkage mechanism 54 comprises an L-shaped rod 58 coupled to a tab 60 welded to the bellcrank 52. The L-shaped rod 58 is connected to a clevis 62 for length adjustment of the linkage mechanism 54 in a conventional manner as shown in FIGS. 2 and 3. The clevis 62 is connected to a height adjustment handle 64 mounted for rotation on a stud 66 coupled to the rear of the mobile platform 20. The height adjustment handle 64 extends through a notched plate 68 having three notches 70, thereby providing three discrete positions in which the bellcrank height adjustment mechanism 50 can be set. It will be apparent that a variety of conventional mechanisms could be substituted for the notched plate 68. However, three discrete positions have proven satisfactory in typical operating conditions. The height adjustment handle 64 is conventionally spring-biased into the notches 70. This prevents the height adjustment handle from slipping out of one notch 70 into another notch 70 inadvertently.

Figure 7:
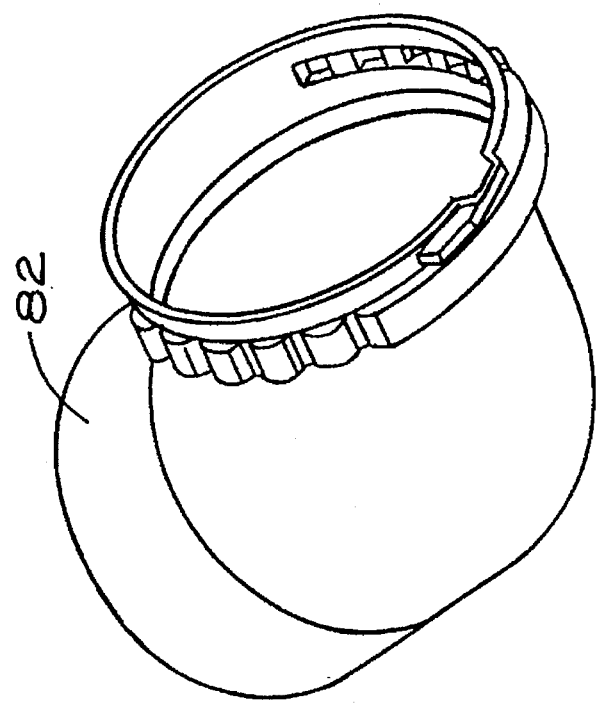
FIG. 7 is a perspective view of a deflector operable with the discharge tube shown in FIG. 6.
Figure 6:
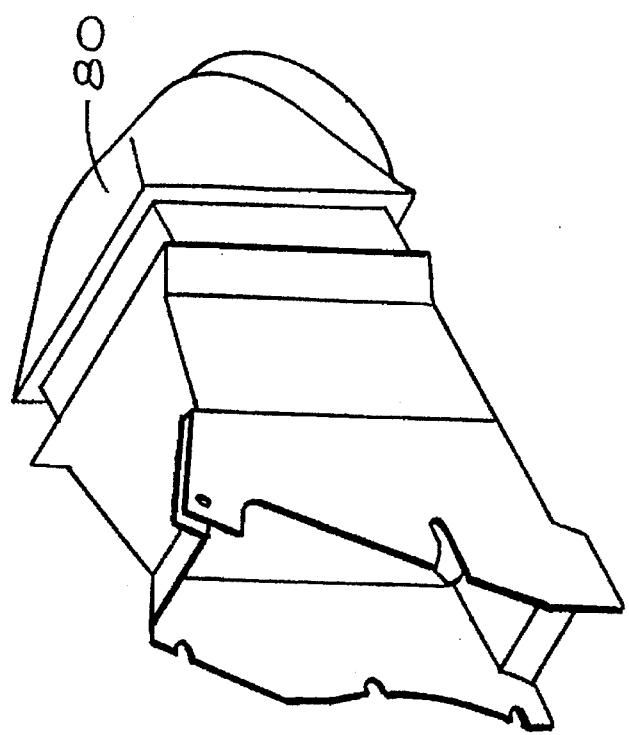
FIG. 6 is a perspective view of a discharge tube.

The vacuum mechanism 16 preferably includes a discharge port 23 coupled to a discharge robe 80 (see FIGS. 1 and 6) coupled to a conventional bag (not shown). Alternatively, the discharge robe 80 can be coupled to a deflector 82 (see FIG. 1). The deflector 82 (shown in FIGS. 1 and 7) is preferably rotatably coupled to the discharge tube 80, and in fluid communication therewith. The discharge port 23 of the vacuum mechanism provides high velocity positive air flow which can be pointed in the desired direction by rotating the deflector 82 as desired. In this way, the yard waste and other relatively light materials can be swept by the high velocity airflow.

The invention provides a chipper vacuum shredder system and apparatus that allows the effective removal of a wide variety of materials from a wide variety of surfaces. The pivotable flap 30 is adjustable from a substantially open position for processing large volumes of relatively light material to a nearly closed position offering high suction for vacuuming heavy materials. The pivotable flap 30 in combination with the bellcrank height adjustment mechanism 50, allows efficient processing in varying yard conditions such as different grass heights, yard waste laying on top of gravel or bark materials or other diverse conditions can be accomplished readily. Further, the deflector 82 can direct high velocity air flow for sweeping operations.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A yard waste chipper vacuum shredder system, comprising:
   a mobile platform;
   a chipper-shredder mechanism carried on said mobile platform;
   a motor coupled to said chipper-shredder mechanism;
   a vacuum mechanism carried by said mobile platform, said vacuum mechanism generating air flow for moving the yard waste to said chipper-shredder mechanism;
   an intake passage in fluid communication with said vacuum mechanism; and
   adjusting means including a baffle structure disposed substantially within said passage for adjusting velocity of the air flow upstream of said vacuum mechanism, said baffle structure being adjustable between a first position blocking substantially a majority of said passage and a second position allowing substantially unimpeded flow in said passage.

2. The system as defined in claim 1, wherein said adjusting means varies the velocity of the air flow in said intake passage upstream of said vacuum mechanism by adjusting said baffle structure between at least a substantially open position allowing substantially unimpeded air flow adjacent said baffle structure and a substantially closed position blocking air flow adjacent said baffle structure.

3. The system as defined in claim 1, wherein said adjusting means retains said baffle structure in a plurality of discrete positions.

4. The system as defined in claim 1, wherein said baffle structure comprises a pivotable flap.

5. The system as defined in claim 1, wherein said baffle structure comprises a pivotable flap including an angled sealing portion.

6. The system as defined in claim 5, wherein said adjusting means includes a linkage coupled to said pivotable flap, said linkage being lockable in a plurality of positions corresponding to a like plurality of positions of said pivotable flap for varying the velocity of the air flow in said intake passage upstream of said vacuum mechanism.

7. The system as defined in claim 1, wherein said vacuum mechanism is disposed downstream of said baffle structure and said chipper-shredder mechanism.

8. The system as defined in claim 1, further including an aperture in said intake passage defining an inlet through which yard waste can be introduced.

9. The system as defined in claim 1, further including an aperture in said intake passage defining a hose inlet and a cap for substantially plugging said aperture.

10. The system as defined in claim 9, wherein said baffle structure is adjusted to a substantially closed position to provide increased velocity of the air flow at said hose inlet.

11. The system as defined in claim 1, further including a nozzle in fluid communication with said intake passage.

12. The system as defined in claim 11, further including nozzle height adjustment means including a bell crank for adjusting height of said nozzle actuated by a single control.

13. The system as defined in claim 12, wherein said height adjustment means comprises a bell crank mechanism coupled to only two wheels of said mobile platform.

14. The system as defined in claim 1, further including a deflector coupled to an exhaust portion of said vacuum mechanism.

15. The system as defined in claim 14, wherein said deflector can be adjusted to direct air flow in a plurality of directions.

16. A yard waste chipper vacuum shredder system, comprising:
   a mobile platform;
   a chipper-shredder mechanism mounted on said mobile platform;
   a motor coupled to said chipper-shredder mechanism;
   a vacuum mechanism for generating air flow for moving yard waste to said chipper-shredder mechanism;
   an intake passage in fluid communication with said vacuum mechanism and having a nozzle disposed upstream of said vacuum mechanism; and
   adjusting means including a baffle structure disposed substantially within said intake passage, said adjusting means adjusting velocity of said air flow at said nozzle by adjusting said baffle structure between a substantially open position and a substantially closed position.

17. The system as defined in claim 16, further including a debris chute adjacent said chipper-shredder mechanism for receiving branches.

18. The system as defined in claim 16, wherein said motor comprises a gasoline engine.

19. A yard waste chipper vacuum shredder system, comprising:
   a chipper-shredder mechanism;
   a motor coupled to said chipper-shredder mechanism;
   a vacuum mechanism for generating air flow for moving yard waste to said chipper-shredder mechanism;

a debris chute adjacent said chipper-shredder mechanism;

an intake passage in fluid communication with said vacuum mechanism having a hose inlet disposed at a portion of said intake passage upstream of said vacuum mechanism; and adjusting means including a baffle structure disposed substantially within said passage, said adjusting means adjusting velocity of the air flow at said debris intake nozzle by adjusting said baffle structure between a substantially open position and a substantially closed position.

20. The system as defined in claim 19, wherein said adjusting means can adjust said baffle structure to a closed position to increase the velocity of the air flow at said hose inlet.

* * * * *